United States Patent [19]
Zaslavsky et al.

[11] Patent Number: 5,576,598
[45] Date of Patent: Nov. 19, 1996

[54] LAMP WITH GLASS SLEEVE AND METHOD OF MAKING SAME

[75] Inventors: Gregory Zaslavsky, Marblehead; Joseph V. Lima, Salem, both of Mass.

[73] Assignee: Osram Sylvania Inc., Danvers, Mass.

[21] Appl. No.: 521,716

[22] Filed: Aug. 31, 1995

[51] Int. Cl.$^6$ .................................................. H01J 61/36
[52] U.S. Cl. ........................... 313/623; 313/25; 313/624; 313/634; 313/578
[58] Field of Search ...................................... 313/623, 625, 313/624, 578, 570, 25, 634, 324, 312, 579, 332, 626

[56] References Cited

U.S. PATENT DOCUMENTS

| | | | |
|---|---|---|---|
| 2,009,202 | 7/1935 | Pirani et al. | 313/25 |
| 2,087,745 | 7/1937 | Verburg et al. | 176/122 |
| 2,116,720 | 5/1938 | Wiegand | 176/122 |
| 4,935,668 | 6/1990 | Hansler et al. | 315/82 |
| 4,949,003 | 8/1990 | Cox et al. | 313/25 |
| 4,963,790 | 10/1990 | White et al. | 313/25 |
| 5,200,669 | 4/1993 | Dixon et al. | 313/623 |
| 5,252,885 | 10/1993 | Muzeroll et al. | 313/25 |
| 5,363,007 | 11/1994 | Fromm et al. | 313/25 |
| 5,388,034 | 2/1995 | Allen et al. | 362/61 |
| 5,406,165 | 4/1995 | Pragt | 313/25 |

Primary Examiner—Sandra L. O'Shea
Assistant Examiner—Ashok Patel
Attorney, Agent, or Firm—William H. McNeill

[57] ABSTRACT

A lamp has a light transmissive glass envelope which includes a light source chamber. At least one glass extension is affixed to the light source chamber and has a sealing area surrounding a portion of it. A patterned metal foil is affixed to and surrounds the sealing area and a glass shroud surrounds at least the light source chamber and has an end sealed to the metal foil.

8 Claims, 2 Drawing Sheets

5,576,598

LAMP WITH GLASS SLEEVE AND METHOD OF MAKING SAME

TECHNICAL FIELD

This invention relates to electric lamps and more particularly to such lamps having a light source chamber containing an atmosphere differing from that of normal atmospheric pressure. Still more particularly, it relates to such lamps utilizing a sleeve or shroud surrounding the light source chamber.

BACKGROUND ART

Glass shrouds surrounding light source chambers have been employed as explosion and implosion protection devices; selective radiation blockers; and for chamber isothermalization. Mounting of the shrouds has presented numerous problems. U.S. Pat. No. 2,087,745 suggests mounting a shroud by attachment to the outer envelope, which requires that the shroud material and the outer envelope material be the same. U.S. Pat. No. 2,116,720 mounts and positions a shroud by means of helical springs. This technique allows different materials for the shroud and outer envelope but lacks in stability, particularly in a longitudinal direction. U.S. Pat. No. 4,935,668 teaches shroud formation of the same material as the light source chamber with attachment thereto or, alternatively, a shroud of a different material with attachment occurring to the lead-in wires. U.S. Pat. No. 5,252,885 discloses a shroud mounting frame attached to the stem lead at one end of the outer envelope and a button or dimple formed at an opposite end of the outer envelope. U.S. Pat. No. 5,363,007 teaches mounting of a shroud by means of a second pinch seal. U.S. Pat. No. 5,388,034 discloses a light source chamber having a shroud mounted to extensions thereof wherein the chamber and the shroud are of the same material (necessary to match the thermal expansion requirements). U.S. Pat. No. 5,406,165 teaches mounting the shroud to the exhaust tubulation of the light source chamber. This technique requires also that the shroud and chamber material be the same.

DISCLOSURE OF INVENTION

It is, therefore, an object of the invention to obviate the disadvantages of the prior art.

It is another object of the invention to enhance lamps employing shrouds.

Yet another object of the invention is the provision of a lamp employing a light source capsule surrounded by rigidly positioned shroud of a dissimilar material.

These objects are accomplished, in one aspect of the invention, by a lamp comprising: a light transmissive glass envelope including a light source chamber; at least one glass extension affixed to said light source chamber; a sealing area surrounding a portion of said extension; a patterned metal foil affixed to and surrounding said sealing area; and a glass shroud surrounding at least said light source chamber and having an end sealed to said metal foil.

Employment of this technique and structure allows glasses of differing thermal expansions to be used as the light source chamber and shroud, resulting in greater stability, and cost savings.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
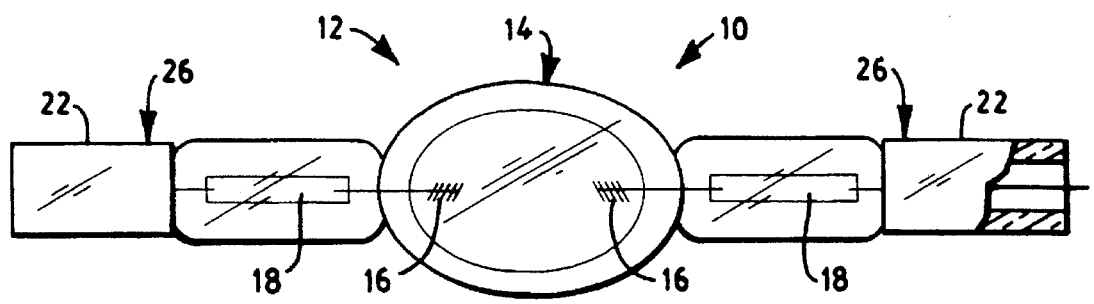
FIG. 1 is an elevational view, partly in section, of a first form of light source chamber useable with the invention.

Referring now to the drawings with greater particularity, there is shown in FIG. 1 a lamp 10, such as an arc discharge lamp of the metal halide type, having a light transmissive glass envelope 12 of, for example, quartz, and having a light source chamber 14. The light source chamber 14 can be provided with a suitable arc generating and sustaining medium, as is known, and can have the usual tungsten electrodes 16 sealed therein by means of molybdenum foils 18.

Figure 2:
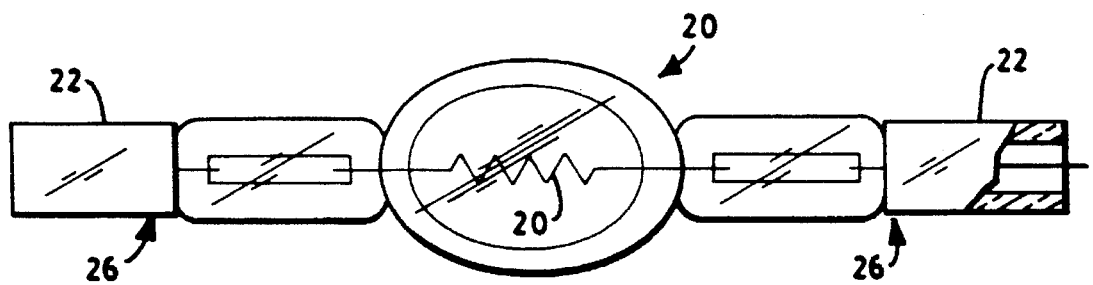
FIG. 2 is an elevational view, partly in section, of a second form of light source chamber useable with the invention.

A similar lamp 20 is shown in FIG. 2 except that lamp 20 is an incandescent lamp with a filament 22. Lamp 20 can be a tungsten-halogen lamp.

In either case, the lamps 10 and 20 are provided with at least one glass extension 22 which has a cylindrical outer surface. In the embodiments of FIGS. 1 and 2 both lamps have two such extensions, the extensions being oppositely disposed along a longitudinal axis of the lamps.

Figure 7:
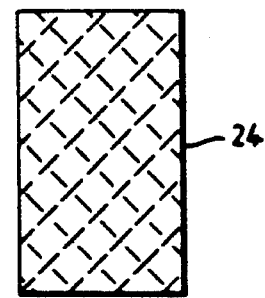
FIG. 7 is an elevational view of a patterned foil for use with the invention.

A patterned metal foil 24 (see FIG. 7) is wrapped in a sealing area 26 about the extension 22. The metal foil is of a high temperature resistant metal, for example molybdenum, having a thickness of about 0.03 mm. The pattern on the foil comprises numerous indentations imprinted upon its surface in a systematic manner. These indentations serve as springs, specifically as cup springs. This allows for substantial thermal expansion mismatch between shroud and capsule material. In particular, using this technique, quartz lamp capsules were shrouded with alumino-silicate glass, NONEX ( a glass available from Osram Sylvania), No. 1724 (a glass available from Corning), No. 180, (A glass available from General Electric), and fused silica. A suitable patterned foil is shown in U.S. Pat. No. 5,200,669 wherein it was used as a sealing agent between a metal electrode and fused silica.

Figure 3:
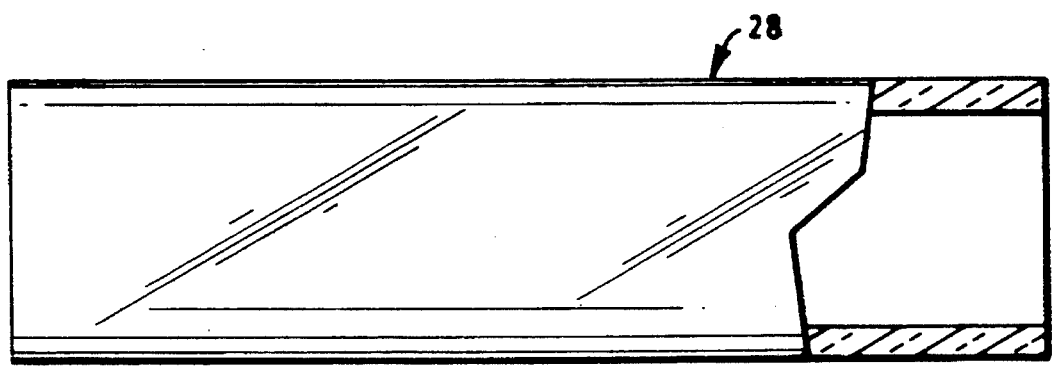
FIG. 3 is an elevational view, partly in section, of a shroud which can by used with the invention.

FIG. 3 illustrates a shroud component 28 which can be a tubular glass sleeve of a suitable material and having an internal diameter large enough to fit over the largest diameter of the lamp 10. Generally, the latter diameter will be the widest part of the light source chamber.

Figure 4:
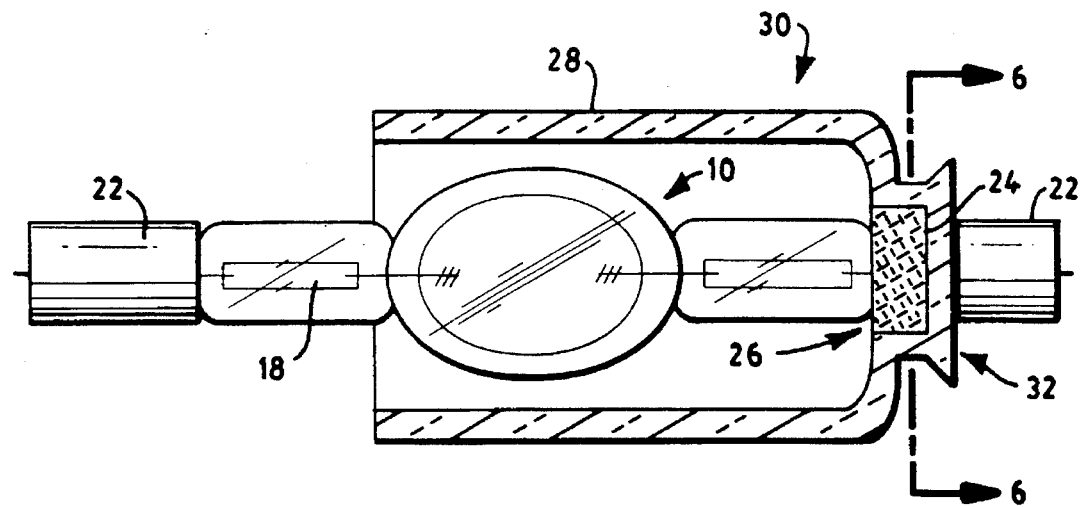
FIG. 4 is an elevational view of an embodiment of the invention.
Figure 6:
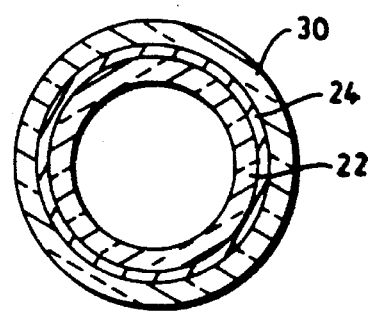
FIG. 6 is a sectional view taken along the line 6—6 of FIG. 5.

FIG. 4 illustrates a first embodiment wherein a shroud 30 formed from component 28 has a first end 32 sealed to a foil 24 at a sealing area 26 on an extension 22. Such a shroud construction can be utilized as a heat loss reducing member as shown in U.S. Pat. No. 4,963,790.

Figure 5:
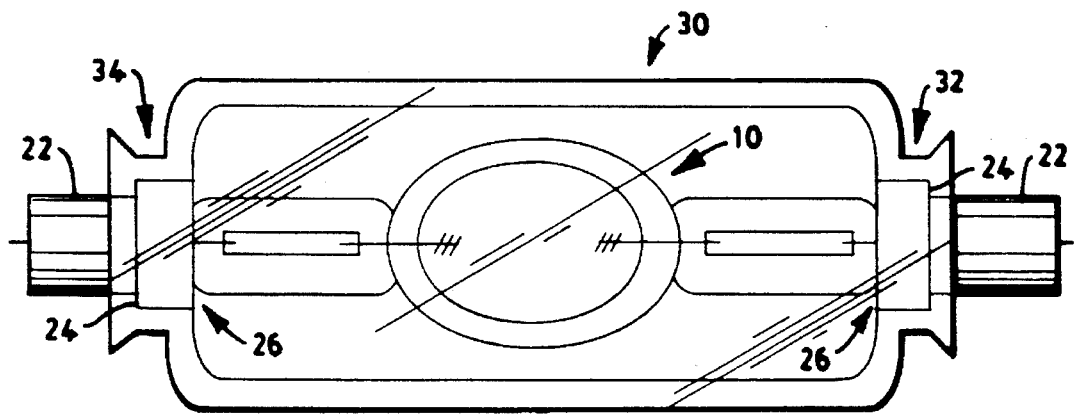
FIG. 5 Is an elevational view of an alternate embodiment of the invention.

FIG. 5 illustrates a second embodiment wherein a shroud 30 has first end 32 and second end 34 sealed to a foil 24 at a sealing area 26 on extensions 22.

Thus, there is provided a lamp having a shroud which is rigidly fixed relative to a light source chamber and which does not require extra mounting brackets. The material of the shroud need not be the same as the material of the lamp, thereby allowing materials with different properties to be used if desired.

While there have been shown an described what are at present considered the preferred embodiments of the invention, it will be apparent to those skilled in the art that various changes and modifications can be made herein without departing from the scope of the invention as defined by the appended claims.

What is claimed is:

1. A lamp comprising: a light transmissive glass envelope including a light source chamber; at least one glass extension affixed to said light source chamber; a sealing area surrounding a portion of said extension; a patterned metal foil affixed to and surrounding said sealing area; a glass shroud surrounding at least said light source chamber and having an end sealed to said metal foil.

2. The lamp of claim 1 wherein said glass envelope and said glass shroud are different glasses.

3. The lamp of claim 2 wherein said lamp is an arc discharge lamp.

4. The lamp of claim 2 wherein said lamp is an incandescent lamp.

5. The lamp of claim 4 wherein said incandescent lamp is a tungsten halogen lamp.

6. The lamp of claim 3 wherein said envelope glass is quartz.

7. The lamp of claim 6 wherein said shroud lamp is an alumino-silicate glass.

8. The lamp of claim 1 wherein said foil is molybdenum.

\* \* \* \* \*